(12) United States Patent
Yu et al.

(10) Patent No.: US 12,483,167 B2
(45) Date of Patent: Nov. 25, 2025

(54) RECTIFIER BRIDGE CLOSED-LOOP CONTROL EXCITATION METHOD AND INITIAL ANODE VOLTAGE ESTABLISHMENT METHOD

(71) Applicant: THREE GORGES INTELLIGENT INDUSTRIAL CONTROL TECHNOLOGY CO., LTD., Hubei (CN)

(72) Inventors: Xiang Yu, Hubei (CN); Jingfei Liu, Hubei (CN); Xiaoshun Wu, Hubei (CN); Haoran Wang, Hubei (CN); Yang Liu, Hubei (CN)

(73) Assignee: THREE GORGES INTELLIGENT INDUSTRIAL CONTROL TECHNOLOGY CO., LTD. (CN)

( * ) Notice: Subject to any disclaimer, the term of this patent is extended or adjusted under 35 U.S.C. 154(b) by 0 days.

(21) Appl. No.: 18/842,391

(22) PCT Filed: Mar. 21, 2023

(86) PCT No.: PCT/CN2023/082919
§ 371 (c)(1),
(2) Date: Aug. 29, 2024

(87) PCT Pub. No.: WO2023/179633
PCT Pub. Date: Sep. 28, 2023

(65) Prior Publication Data
US 2025/0183826 A1 Jun. 5, 2025

(30) Foreign Application Priority Data

Mar. 22, 2022 (CN) .......................... 202210284788.8
Mar. 22, 2022 (CN) .......................... 202210284805.8

(51) Int. Cl.
*H02P 9/00* (2006.01)
*H02P 9/30* (2006.01)
*H02P 103/20* (2016.01)

(52) U.S. Cl.
CPC .......... *H02P 9/305* (2013.01); *H02P 2103/20* (2015.01)

(58) Field of Classification Search
CPC ............................ H02P 9/305; H02P 2103/20
See application file for complete search history.

(56) References Cited

FOREIGN PATENT DOCUMENTS

| CN | 110880892 A | * | 3/2020 |
| JP | 2001061299 A | * | 3/2001 |

* cited by examiner

*Primary Examiner* — Julio C. Gonzalez (57) ABSTRACT

A rectifier bridge closed-loop control excitation method and an initial anode voltage establishment method are provided. In the method, an excitation function is periodically invoked to calculate a given value Ref, a rectifier bridge control angle is calculated, and a bridge rectifier is controlled; the whole excitation process is under closed-loop control, a terminal voltage of a generator rises quickly and smoothly, an excitation voltage is almost free of oscillation, overshoot is small, and adaptability to generator sets with different time constants is good; and when an initial anode voltage is established, excitation reliability is improved by combining an initial excitation power supply and a full conduction function of the bridge rectifier, and the full conduction control of the rectifier bridge is used as an emergency measure when the initial excitation power supply fails, so that the initial anode voltage is established with a relatively large probability.

2 Claims, 10 Drawing Sheets

Fig. 11a b. excitation to rated voltage (full conduction of rectifier bridge)

Fig. 11b

Fig. 12 a. Output voltage of rectifier bridge b. Output voltage of initial excitation power supply c. Input voltage of rotor winding

Fig. 13

RECTIFIER BRIDGE CLOSED-LOOP CONTROL EXCITATION METHOD AND INITIAL ANODE VOLTAGE ESTABLISHMENT METHOD

FIELD

The present invention belongs to the field of automatic control, and particularly relates to a rectifier bridge closed-loop control excitation method and an initial anode voltage establishment method in an excitation process suitable for an excitation system adopting a self-shunt excitation connection mode.

BACKGROUND

An excitation process of a generator is a process of establishing a voltage of the generator after the generator enters an idling state. According to the national standard GBT7409.3-2007, in the case of 100% voltage excitation of the generator, adjustment time should not exceed 10 seconds, a number of oscillations should not exceed 3, and voltage overshoot should not exceed 15% of a rated voltage.

Most of the excitation processes require that a terminal voltage of the generator rises to the rated value in a normal state and the terminal voltage of the generator rises to a bus voltage for quick grid connection in a few cases. In a testing state, the terminal voltage of the generator may rise to any value within an allowable setting range, the generator may even be excited in the form of excitation current, and the excitation current is increased to a given value. However, there is no requirement for overshoot and oscillation of the excitation process in the testing state.

Figure 1:
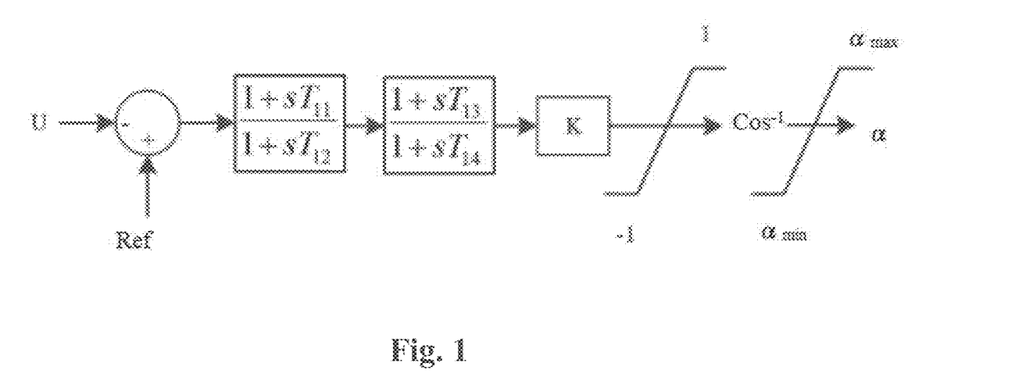
FIG. 1 is a schematic diagram of a series PID transfer function.

Excitation control is generally PID (Proportional-Integral-Derivative) control, which is namely rectifier bridge closed-loop control, and FIG. 1 shows a typical series PID control transfer function, wherein U is a measured value of a current terminal voltage of the generator, Ref is the given value, which is namely a control target, $T_{11} < T_{12}$, $(1+sT_{11})/(1+sT_{12})$ is a differential link, $T_{13} > T_{14}$, $(1+sT_{13})/(1+sT_{14})$ is a differential link, and K is a gain. In closed-loop control, a deviation between the voltage U and the given value Ref passes through a PID link to obtain a control amount, the control amount is limited and then passes through an anti-cosine link to obtain a control angle, and the control angle is limited and then converted into a trigger pulse to control output of a rectifier bridge. The limiting refers to comparing a result with a limiting range, if the result is greater than a maximum value, the maximum value is output, if the result is less than a minimum value, the minimum value is output, and if the result is between the maximum value and the minimum value, there is no change. In order to ensure that a controller has enough time delay to complete an interrupt service routine, a minimum control angle α should not be 0, and is generally 5° to 15°. A maximum control angle is greater than or equal to 90° and less than 130°, and is generally set to be 120°. Open-loop control refers to skipping a PID control result and directly specifying the control angle, and in this case, the deviation between the voltage and the given value has nothing to do with the control angle.

Time constants, rated anode voltages of excitation systems and other parameters of generator sets are different, which leads to a great difference of voltage rising speeds of different generator sets in the excitation process and a great difference of time consumptions of the excitation process with stable voltage build-up: an excitation process for a generator set with 10 MW capacity may be completed in 3 seconds to 4 seconds, and an excitation process for a super-large hydraulic turbine set with 350 MW capacity has exceeded the national standard requirement of 10 seconds.

The excitation process of each manufacturer is different, the voltage is generally required to be established quickly, and the oscillation and overshoot caused by the excitation process should be as small as possible.

Figure 3:
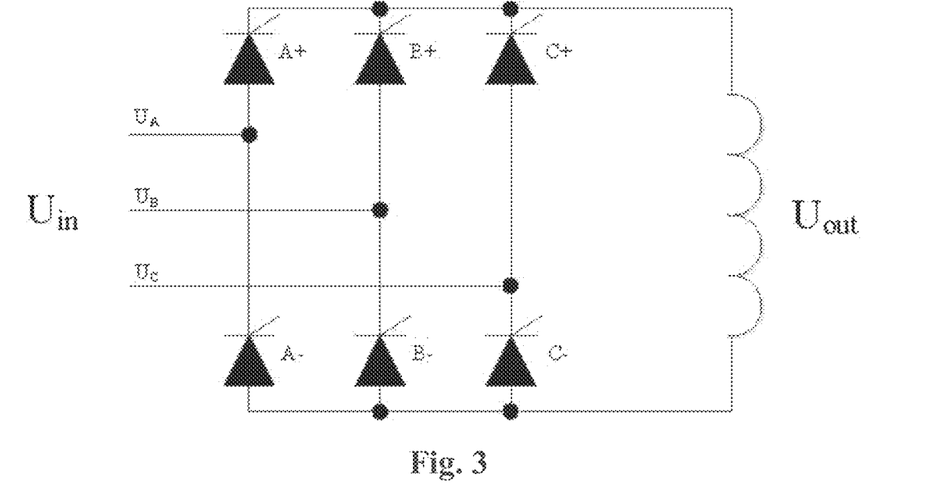
FIG. 3 is a circuit diagram of a three-phase fully-controlled rectifier bridge.

A relationship between an input voltage and an output voltage of a three-phase fully-controlled rectifier bridge may be expressed as: $U_{out} = 1.35 U_{in} \cos \alpha$, as shown in FIG. 3, wherein α is a rectifier bridge control angle, $U_{in}$ is an effective value of an input anode voltage, and $U_{out}$ is an output voltage of the rectifier bridge.

Figure 4:
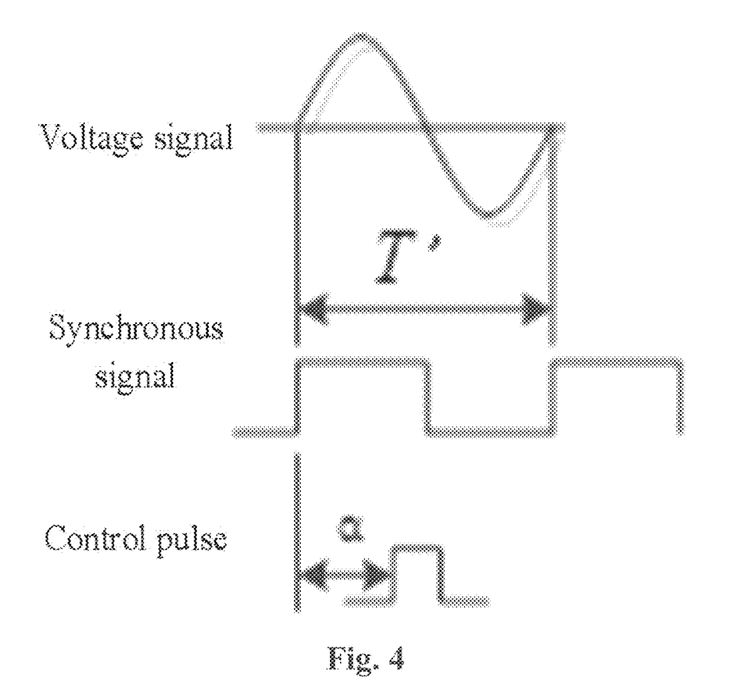
FIG. 4 is a schematic diagram of a synchronous square wave and a control angle.

As shown in FIG. 4, in the excitation system, a sine wave of the anode voltage or the terminal voltage is generally shaped and modulated into a square wave signal through a hardware circuit, a rising edge corresponds to arising zero-crossing point of the sine wave, and control angle interrupt is set in synchronous interrupt triggered by the rising edge of the square wave signal.

A time difference between two synchronous interrupts is a sine wave period T', and an interrupt delay $t_\alpha$ corresponding to the control angle α is $$t_\alpha = \alpha \cdot \frac{T'}{360}.$$

Figure 5A:
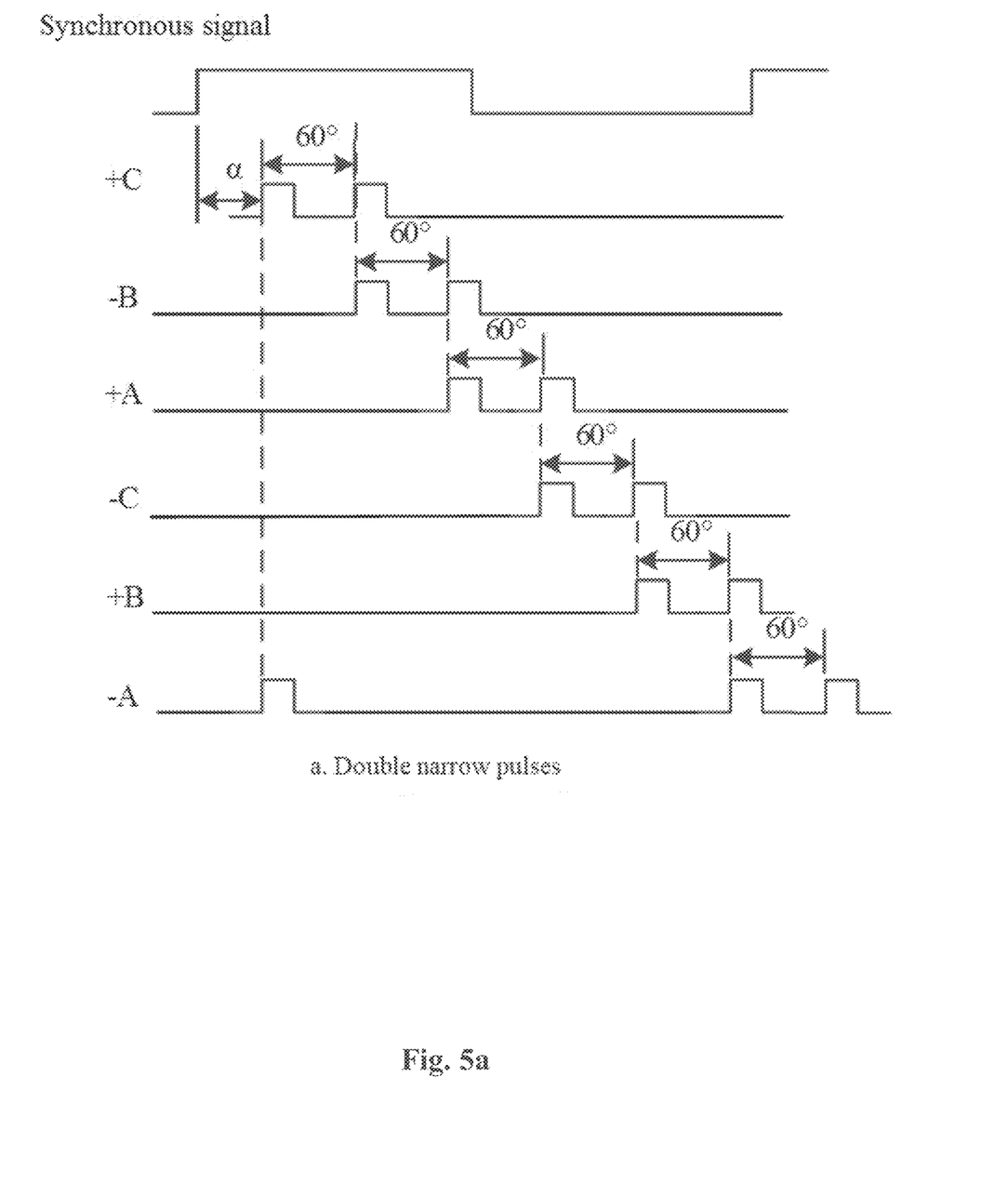
FIG. 5(a) is a schematic diagram of silicon controlled trigger double narrow pulses.
Figure 5B:
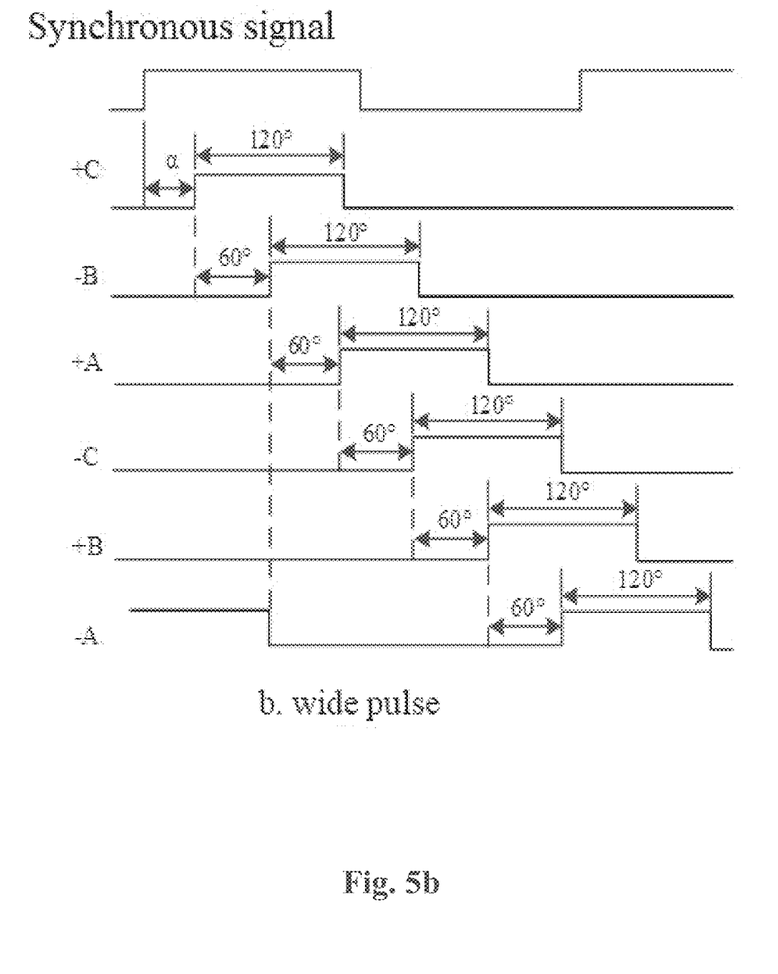
FIG. 5(b) is a schematic diagram of a silicon controlled trigger wide pulse.

The trigger pulse output by the excitation system to a thyristor may be double narrow pulses as shown in FIG. 5(a) or a 120° wide pulse as shown in FIG. 5(b). When the double narrow pulses are used, pulse power is small, and a pulse transformer with a smaller capacity may be selected. When the wide pulse is used, a range of control angle capable of being normally controlled is larger.

Figure 6:
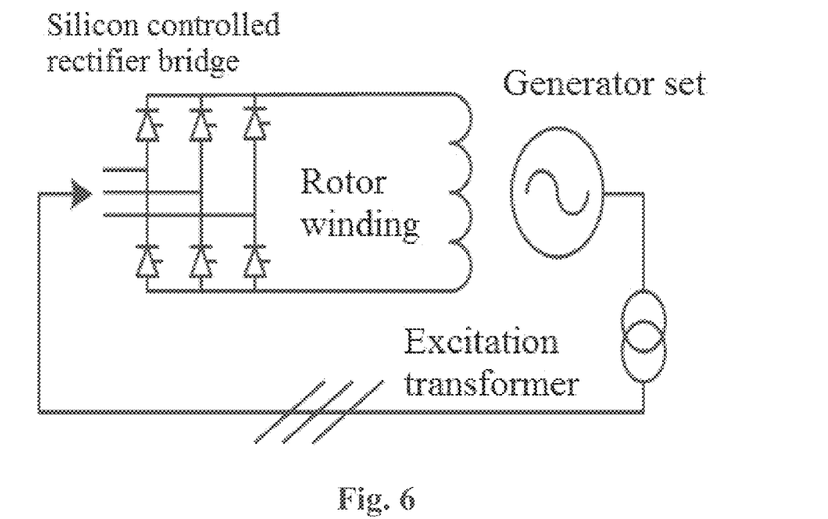
FIG. 6 is a schematic diagram of a self-shunt excitation system.

As shown in FIG. 6, the terminal voltage is reduced by an excitation transformer and then used as an anode power supply of the rectifier bridge, which is called a self-shunt connection mode, and in this way, when the terminal voltage is improved, the anode voltage of the rectifier bridge is also improved, and the output excitation voltage is also improved. This positive feedback characteristic makes a self-shunt excitation system respond quickly and become a mainstream connection mode of current excitation system.

The terminal voltage before starting the excitation process is called a residual voltage.

When all 6 bridge arms of the rectifier bridge are conducted, the rectifier bridge is equivalent to a diode rectifier bridge. In this case, an output voltage is the largest, which is equivalent to that α=0°, and in this case, the output of the rectifier bridge is unchanged at 0°, which has nothing to do with the voltage deviation, and the control of the rectifier bridge has nothing to do with a synchronous signal, which is namely the rectifier bridge open-loop control. If residual magnetism of the generator is large enough, that is, the residual voltage of the generator is high enough, when all 6 arms of the rectifier bridge remain conducted at this stage, the terminal voltage and the anode voltage of the generator can still be improved to levels for realizing normal excitation control.

In an initial stage of excitation, because the terminal residual voltage of the generator is extremely low, the trigger pulse is unable to maintain a conducting state due to a too small current after enabling a bridge arm thyristor, and the rectifier bridge cannot realize effective output to improve the terminal voltage of the generator. At this stage, the rectifier bridge closed-loop control is generally adopted, that is, an initial excitation power supply is enabled to improve the excitation voltage, and then the terminal voltage of the generator is increased to a certain extent, so that a bridge arm current of the rectifier bridge is not less than a minimum current to ensure the conduction of the thyristor, and the rectifier bridge can realize effective output, which is equivalent to a control mode of feeding back to an input end to affect input. When switching to the closed-loop control, the rectifier bridge control angle no longer adopts the constant 0°, and the rectifier bridge control angle adopts an output result of a PID algorithm, which will change with the change of the voltage deviation, and the rectifier bridge is controlled according to the rectifier bridge control angle. In this case, the terminal voltage is called an initial excitation withdrawal voltage, and in this case, the anode voltage is called an initial anode voltage. A lower limit of a setting range of the given value is generally slightly higher than the initial excitation withdrawal voltage. If the initial excitation power supply fails, the rectifier bridge of the excitation system cannot work normally because the anode voltage is too low, resulting in excitation failure.

In an excitation stage, a high level may also be input to a control end of each bridge arm of the rectifier bridge in an initial stage of excitation, and an unconventional trigger pulse maintains each bridge arm in a full conducting state. When the residual voltage of the generator is high enough, an initial anode voltage may be established without enabling the initial excitation power supply. However, if the generator set is shut down for too long, or remnant magnetism of a rotor of the generator is eliminated due to maintenance, the anode voltage may be too low in excitation, and the excitation system will be unable to increase the voltage of the generator by the full conduction of the rectifier bridge. In this case, the application of full conduction function of the rectifier bridge achieves no effect.

Figure 7:
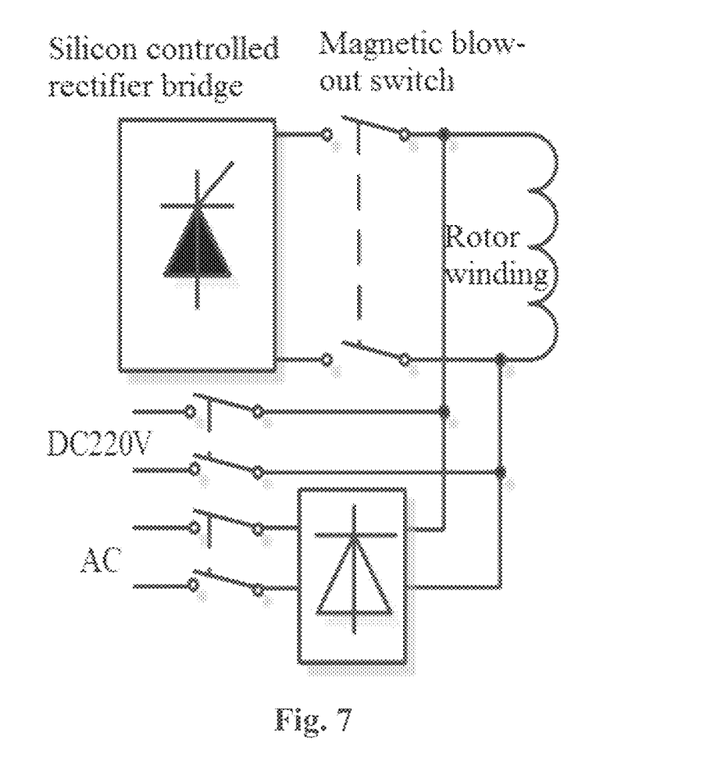
FIG. 7 is a schematic diagram of an initial excitation power supply.
Figure 12:
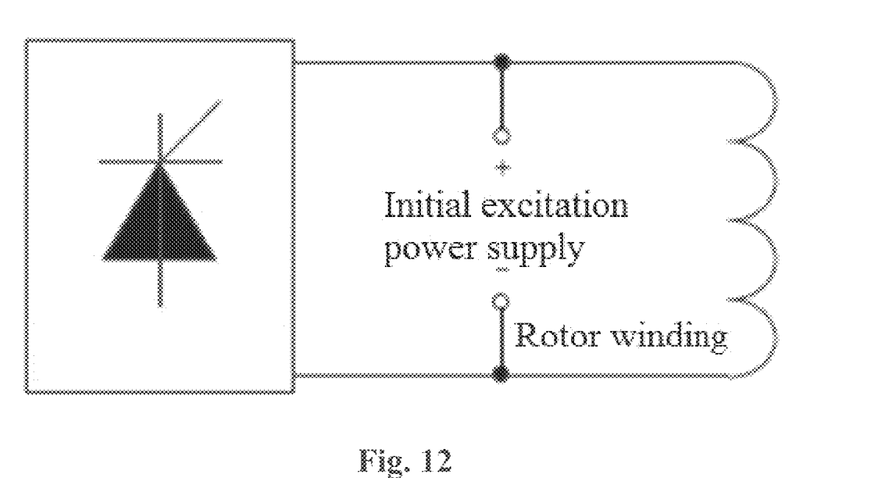
FIG. 12 is a schematic diagram of an equivalent circuit after the initial excitation power supply is enabled.
Figure 13:
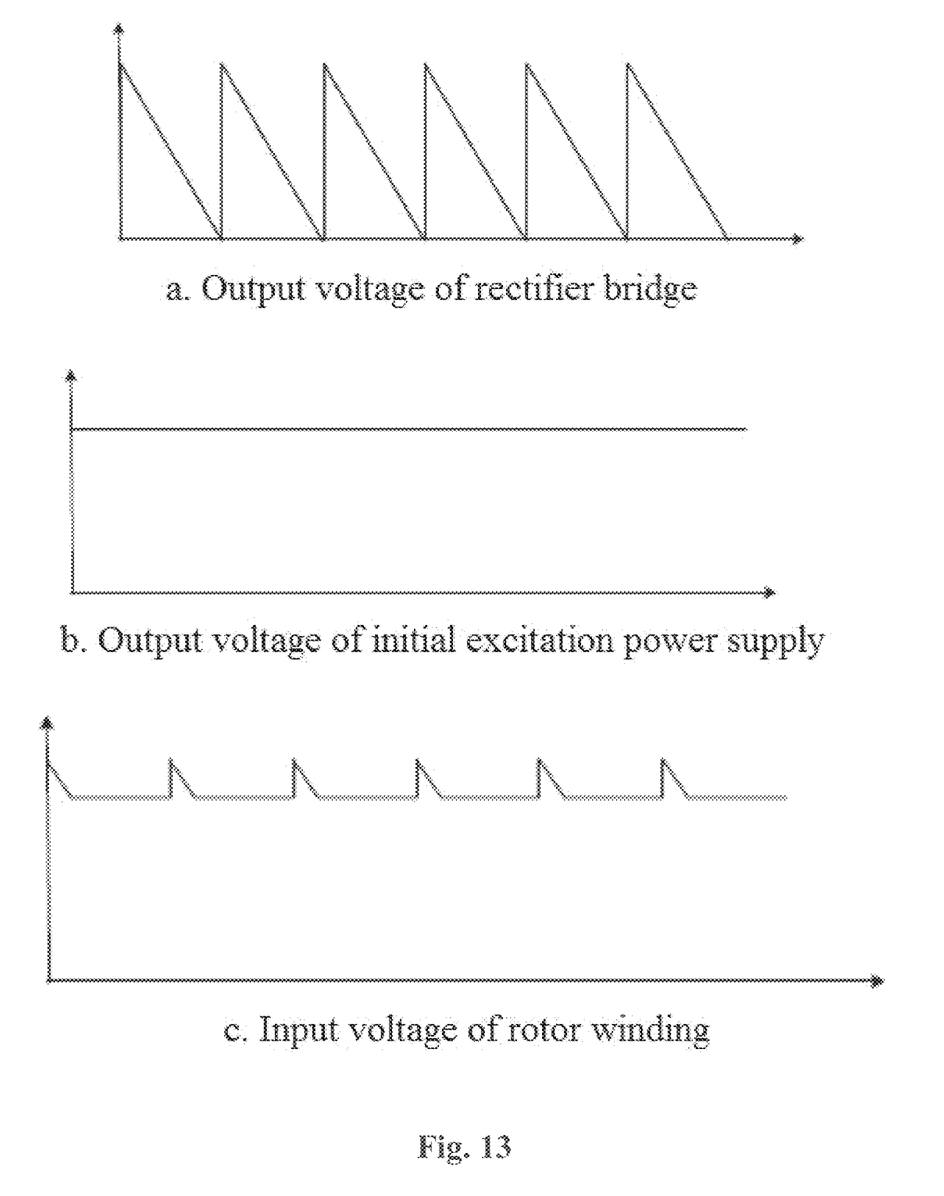
FIG. 13 is a schematic diagram of an input voltage of a rotor winding after the initial excitation power supply is enabled.

An equivalent circuit of the excitation system before enabling the initial excitation power supply is as shown in FIG. 6, and there are only outputs of the rectifier bridge at two ends of a rotor winding. The enabled initial excitation power supplies, as shown in FIG. 7, are direct current power supplies connected in parallel to the rotor winding, which may be obtained by direct use of the direct current power supplies or by rectification through alternating current power supplies. The enabled initial excitation power supplies and the outputs of the rectifier bridge are connected in parallel to two sides of the rotor winding. FIG. 7 may be simplified to the following form as shown in FIG. 12, and after the initial excitation power supplies are connected in parallel with the outputs of the rectifier bridge, voltages at two ends of the rotor winding are as shown in FIG. 13(a), FIG. 13(b) and FIG. 13(c). The output can only be realized by one of the two power supplies with a higher voltage. After the initial excitation power supplies are enabled, an input voltage of the rotor winding is effectively improved. In the excitation system in the self-shunt excitation connection mode, the anode voltage is lower than the initial anode voltage in the initial stage of the excitation process, and even at the minimum control angle, the minimum current to ensure the conduction of the thyristor cannot be maintained, and the output excitation voltage is basically 0. In this case, the initial excitation power supplies are connected, and one direct current voltages are superimposed at two ends of the rotor winding to improve the terminal voltage, and then the anode voltage of the rectifier bridge is increased to ensure that the rectifier bridge can work normally. When the terminal voltage is continuously improved to a certain stage, the initial excitation power supplies may be terminated, and in this case, the anode voltage of the rectifier bridge is enough to ensure a follow current of the rectifier bridge to work normally.

Figure 8:
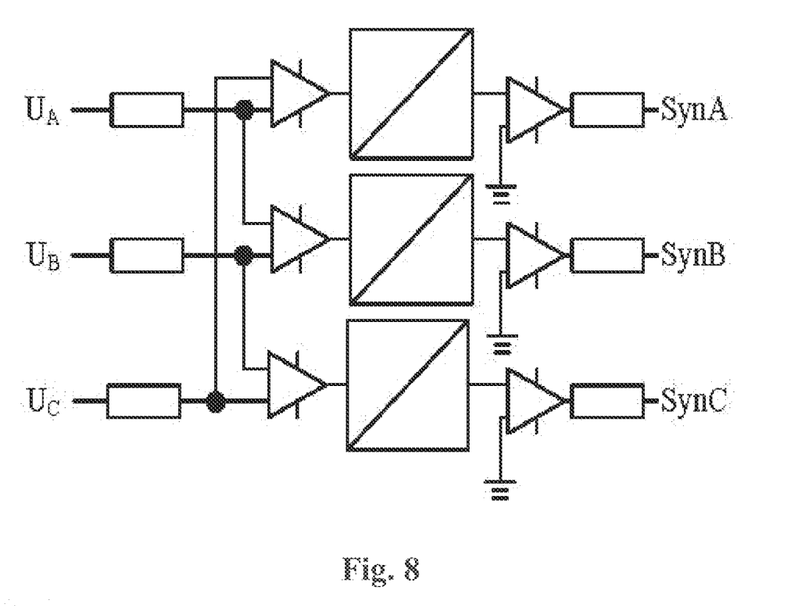
FIG. 8 is a schematic diagram of a synchronous shaping circuit.

If a synchronous signal shaping circuit as shown in FIG. 8 is adopted in the excitation system, an output signal can only be changed from a low level to a high level after the input voltage reaches a threshold.

Figure 9:
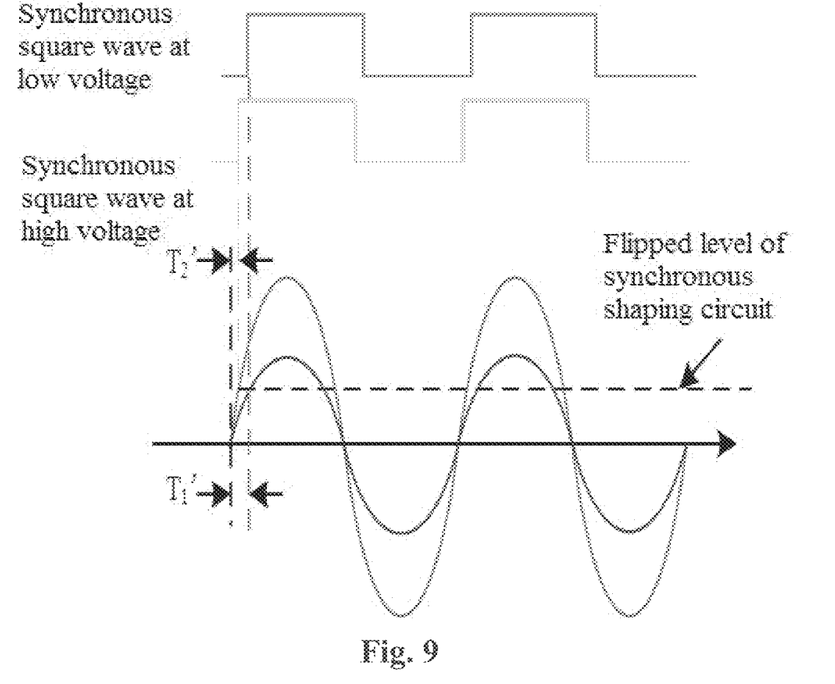
FIG. 9 is a schematic diagram of a phase deviation of synchronous signals under different input voltages.
Figure 10:
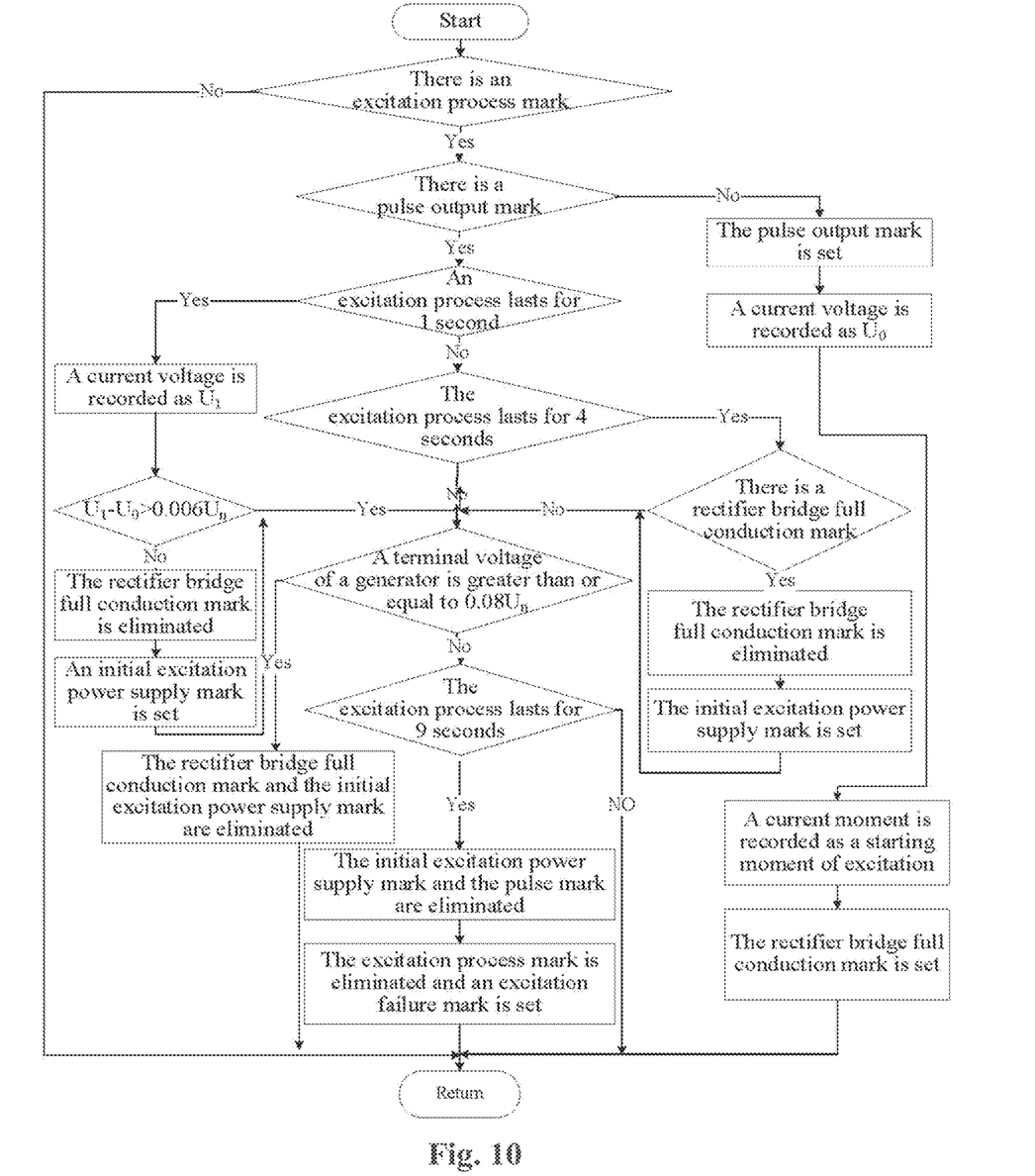
FIG. 10 is a flow chart of initial voltage establishment in an excitation process.

An amplitude of the input voltage in the synchronous signal shaping circuit has a certain influence on a synchronous phase, especially at a low voltage, there is a large phase lag, as shown in FIG. 9. The excitation system works at a high voltage in most cases, so that a software compensation $T_1'$ can ensure the consistency between output and theory. However, in the initial stage of the excitation process, the input voltage is low, $T_1'<T_2'$, and the output voltage of the rectifier bridge may be less than a theoretical value due to insufficient synchronous phase compensation.

SUMMARY

Technical Problem

A first object of the present invention is to provide a rectifier bridge closed-loop control excitation method aiming at realizing quick excitation and reducing the oscillation and overshoot caused by an excitation process. When a given value rises smoothly in the excitation process, a terminal voltage and an excitation voltage of a generator may also change smoothly, when the terminal voltage of the generator approaches the given value in a later stage of the excitation process, the terminal voltage rises smoothly with the given value, and the overshoot and oscillation generated at the end of the excitation process are very small, and in addition, it is only necessary to adjust time of the excitation process to adapt to generator sets with different time constants.

A second object of the present invention is to provide an initial anode voltage establishment method in an excitation process aiming at increasing a probability of establishing an initial anode voltage, reducing the application of an initial excitation power supply as far as possible and prolonging the service life of a contactor for controlling the initial excitation power supply. The reliability of excitation can be improved by combining an initial excitation power supply with a full conduction function of a rectifier bridge, the full conduction control of the rectifier bridge may be used as an emergency measure when the initial excitation power supply fails, and there is a greater probability of establishing the initial anode voltage. Secondly, the application of the initial excitation power supply is reduced as far as possible, and the service life of the contactor for controlling the initial excitation power supply is prolonged. Finally, if residual magnetism of the generator is too low, that is, an terminal residual voltage of the generator is too low, the terminal voltage cannot be increased through the full conduction control of the rectifier bridge, and the full conduction control of the rectifier bridge may be withdrawn as soon as possible through voltage detection after 1 second, so that the excitation process is not prolonged for too long.

Solution

The first object of the present invention is achieved by the following technical means.

A rectifier bridge closed-loop control excitation method comprises rectifier bridge closed-loop control, which comprises the following steps of:

calculating, by an excitation system, a difference between an actually measured terminal voltage of a generator and a given value Ref, calculating a rectifier bridge control angle through PID, and controlling a rectifier bridge according to the rectifier bridge control angle, wherein, in the rectifier bridge closed-loop control, the given value Ref is calculated by invoking an excitation function periodically;

every time the excitation function is invoked in the excitation process, a count value of an excitation process counter is progressively increased by 1, the given value Ref is an expected numerical value that the terminal voltage of the generator obtained by the excitation function in each time is supposed to reach, and the excitation function is:

$$Ref = Ref_0 \times \sin\left(11.9° + \frac{Start\_C}{Start\_T} \times 0.703°\right);$$

$Ref_0$ is a preset target given value, which is an expected numerical value that the terminal voltage of the generator is supposed to reach when the excitation process is ended; and in the case that Start_T=Start_C×T, when the actually measured terminal voltage U of the generator is greater than a second set voltage, the excitation is considered to be completed, and when the actually measured terminal voltage U is less than or equal to the second set voltage, the excitation fails, wherein Start_C is a number of invocations of the excitation function recorded by the excitation process counter in the rectifier bridge closed-loop control, Start_T is time of the excitation process in the rectifier bridge closed-loop control, and T is a period of invocation of the excitation function in the rectifier bridge closed-loop control.

The second set voltage is 0.08 times a rated voltage.

The second object of the present invention is achieved by the following technical means.

An initial anode voltage establishment method for controlling a rectifier bridge by the rectifier bridge closed-loop control excitation method above comprises the following steps of:

step 1: when the excitation process starts, recording a current terminal voltage of the generator and a starting moment of the excitation process;

step 2: controlling, by the excitation system, all 6 bridge arms of a fully controlled rectify bridge to be conducted, and maintaining the rectifier bridge in a conducting state;

step 3: recording the terminal voltage of the generator again after 1 second from an excitation moment;

when an increase of the terminal voltage of the generator is less than the first set voltage, proceeding to step 5, and when the increase of the terminal voltage of the generator is greater than or equal to the first set voltage, continuously maintaining the rectifier bridge in the full conducting state, and proceeding to step 4;

step 4: when the terminal voltage of the generator reaches the second set voltage within 4 seconds from the excitation moment, withdrawing the rectifier bridge from the full conducting state, and switching the rectifier bridge to the rectifier bridge closed-loop control, and when the terminal voltage of the generator does not reach the second set voltage within 4 seconds from the excitation moment, proceeding to step 5, wherein the second set voltage is greater than the first set voltage;

step 5: withdrawing the rectifier bridge from the full conducting state, enabling an initial excitation power supply, switching the rectifier bridge to the rectifier bridge closed-loop control, and then proceeding to step 6; and step 6: when the terminal voltage of the generator still does not rise to the second set voltage within 10 seconds from the starting moment, stopping output by the excitation system, and reporting an excitation failure fault; and when the terminal voltage of the generator rises to the second set voltage within 10 seconds from the starting moment, terminating the initial excitation power supply, and continuously executing the excitation process.

The first set voltage is 0.006 times a rated voltage, and the second set voltage is 0.08 times a rated voltage.

Beneficial Effects:

According to the present invention, in the excitation process of the rectifier bridge closed-loop control, the terminal voltage of the generator rises quickly and smoothly, the excitation voltage hardly oscillates, and the overshoot is small, thus having good adaptability to generator sets with different time constants. A small abrupt change of the control angle at the end of the excitation process is convenient for a user to identify an end point of the excitation process.

The reliability of excitation can be effectively improved by combining the initial excitation power supply with the full conduction function of the rectifier bridge, the full conduction control of the rectifier bridge may be used as an emergency measure when the initial excitation power supply fails, and there is a greater probability of establishing the initial anode voltage, thus ensuring the smooth excitation and voltage build-up of the generator. Secondly, the application of the initial excitation power supply is reduced as far as possible, and the service life of the contactor for controlling the initial excitation power supply is prolonged. Finally, if the terminal residual voltage of the generator is too low, the terminal voltage cannot be increased through the full conduction control of the rectifier bridge, and the full conduction control of the rectifier bridge may be withdrawn as soon as possible through voltage detection after 1 second, so that the excitation process is not prolonged for too long.

BRIEF DESCRIPTION OF THE DRAWINGS

FIG. 11(*a*) is a schematic diagram of excitation to a rated voltage (application of the initial excitation power supply), and FIG. 11(*b*) is a schematic diagram of excitation to a rated voltage (full conduction of a rectifier bridge);

DETAILED DESCRIPTION

In order to facilitate the understanding and implementation of the present invention by those of ordinary skills in the art, the present invention will be further described in detail hereinafter with reference to embodiments. It should be understood that the embodiments described herein are only used to illustrate and explain the present invention, and are not used to limit the present invention.

Embodiment 1

According to a rectifier bridge closed-loop control excitation method, a given value is set according to a sine curve, and the rectifier bridge closed-loop control excitation method comprises the following steps.

In step 1, a target given value $Ref_0$ is set, the target given value $Ref_0$ is an expected numerical value that a terminal voltage of a generator is supposed to reach at the end of an excitation process, and a given value Ref is an expected numerical value that the terminal voltage of the generator obtained by the excitation function in each time is supposed to reach. In this embodiment, a period of invocation of the excitation function is about 10 milliseconds.

In step 2, after an excitation system receives an instruction of rectifier bridge closed-loop control excitation, the excitation system processes to the excitation process, and in the excitation process, the excitation function is invoked with the period of 10 milliseconds, and the excitation system calculates the given value Ref through the excitation function.

A difference between an actually measured terminal voltage of the generator and the given value Ref is calculated by the excitation system, a rectifier bridge control angle is calculated through PID, and a rectifier bridge is controlled according to the rectifier bridge control angle.

The given value Ref is set as $$Ref = Ref_0 \cdot \sin\left(11.9° + \frac{Start\_C}{Start\_T} \cdot 0.703°\right),$$

wherein, Start_C is a number of invocations of the excitation function recorded by an excitation process counter in the rectifier bridge closed-loop control, a count value is 0 when the excitation function is invoked for the first time, a corresponding given value Ref is $Ref_0*\sin 11.9°$, which is about 0.2 times the target given value $Ref_0$, T is a period of invocation of the excitation function in a unit of second, and Start_T is time of the excitation process in the rectifier bridge closed-loop control in a unit of second.

Every time the excitation function is invoked in the excitation process, the count value of the excitation process counter is progressively increased by 1.

In step 3, in the case that Start_T=Start_C×T, Ref=sin 82.2°$Ref_0 \approx 0.99 Ref_0$, when the actually measured terminal voltage U of the generator is greater than a second set voltage, the excitation is considered to be completed, and the second set voltage is 0.08 times a rated voltage Un, and when the actually measured terminal voltage U is less than or equal to the second set voltage, the excitation process fails to complete a voltage build-up task, and the excitation fails. According to field experience, when U>0.08 Un, a synchronous signal is normal, an output of the rectifier bridge is controllable, and a deviation between the terminal voltage of the generator and the given value may be adjusted by closed-loop control. Generator sets with different capacities correspond to different time constants, by setting different Start_T, which is the time of the excitation process from receiving the excitation instruction to completing the excitation voltage build-up, the excitation process may achieve an ideal excitation performance in different generator sets.

In the present invention, the change of the given value has nothing to do with the terminal voltage of the generator, and the whole excitation process is under closed-loop control.

Figure 2:
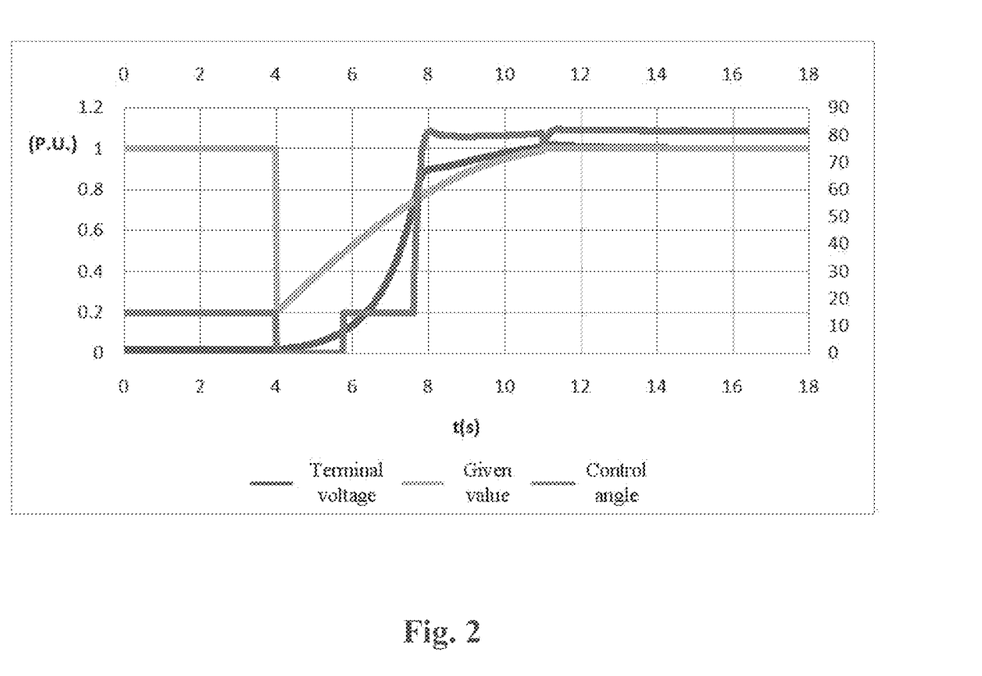
FIG. 2 is an oscillogram of excitation.

FIG. 2 shows an oscillogram of actual excitation of a certain generator set. A Y-axis main coordinate P.U. in the oscillogram represents a per-unit value, which is used for showing the terminal voltage of the generator and the given value, and a Y-axis secondary coordinate represents an angle, which is used for showing a control angle of the rectifier bridge. The time of the excitation process is set to be 7 seconds, and the generator is excited to the rated voltage. When t=4 s, the excitation process starts, and when t=11 s, the excitation process is ended. A number of oscillation of the terminal voltage is 0.5, and the overshoot of the terminal voltage is 0.019 times the rated voltage.

Implementation of the Present Invention

In order to facilitate the understanding and implementation of the present invention by those of ordinary skills in the art, the present invention will be further described in detail hereinafter with reference to embodiments. It should be understood that the embodiments described herein are only used to illustrate and explain the present invention, and are not used to limit the present invention.

Embodiment 2

According to an initial anode voltage establishment method in an excitation process in which fill conduction of a rectifier bridge is combined with an initial excitation power supply, the rectifier bridge is controlled by the rectifier bridge closed-loop control excitation method in Embodiment 1, and the initial anode voltage establishment method comprises the following steps.

In step 1, when the excitation process starts, a current terminal voltage of the generator and a starting moment of the excitation process are recorded.

In the excitation system, an on-chip timer of a CPU is generally used for circular counting progressively increased from 0 to a maximum value as a common clock of each process. A maximum count value of a 32-bit timer is $2^{32}-1$, and when counting at a frequency of 84 MHz, maximum counting time exceeds 51 seconds, which can meet most timing requirements of high-speed control.

In step 2, all 6 bridge arms of a fully controlled rectify bridge are controlled by the excitation system to be conducted, and the rectifier bridge is maintained in a conducting state.

In this stage, rectifier bridge open-loop control is implemented, and the full conduction of all 6 bridge arms of the rectifier bridge is equivalent to the output at 0° control angle, which realizes the maximum output of the fully controlled rectifier bridge and is beneficial for the establishment of an initial anode voltage.

In step 3, the terminal voltage of the generator is recorded again after 1 second from an excitation moment, when an increase of the terminal voltage of the generator is less than 0.006 times the rated voltage (the first set voltage), the residual voltage of the generator is too low to establish the initial anode voltage, and the operation proceeds to step 5; and when the increase of the terminal voltage of the generator is greater than or equal to 0.006 times the rated voltage, the residual voltage of the generator is enough to realize the excitation, without needing to enable the initial excitation power supply, then the rectifier bridge is continuously maintained in the full conducting state, and the operation proceeds to step 4.

In step 4, when the terminal voltage of the generator reaches 0.08 times the rated voltage (the second set voltage) within 4 seconds from the excitation moment, the initial anode voltage is successfully established, the rectifier bridge open-loop control is withdrawn, the rectifier bridge is withdrawn from the full conducting state, the rectifier bridge is switched to the rectifier bridge closed-loop control in Embodiment 1, and the excitation process is continuously executed; and when the terminal voltage of the generator does not reach 0.08 times the rated voltage within 4 seconds from the excitation moment, the operation proceeds to step 5, wherein the second set voltage is greater than the first set voltage.

In step 5, the rectifier bridge is withdrawn from the full conducting state, the initial excitation power supply is enabled, the rectifier bridge is switched to the rectifier bridge closed-loop control in Embodiment 1, and then the operation proceeds to step 6.

In step 6, when the terminal voltage of the generator still does not rise to 0.08 times the rated voltage (the second set voltage) within 10 seconds from the starting moment, the anode voltage cannot be initialized, the excitation fails, output by the excitation system is stopped, and an excitation failure fault is reported; and when the terminal voltage of the generator rises to 0.08 times the rated voltage (the second set voltage) within 10 seconds from the starting moment, the initial anode voltage is successfully established, the initial excitation power supply is terminated, and the excitation process is continuously executed.

In the excitation process, the situation that the terminal voltage of the generator reaches 0.08 times the rated voltage is used as a criterion for establishing the initial anode voltage, and under this voltage, the excitation system can continuously improve the terminal voltage of the generator through closed-loop control. A lower limit of a setting range of the terminal voltage of the generator is generally slightly higher than 0.08 times the rated voltage.

The priority is given to the full conduction of the rectifier bridge in the initial stage of the excitation process, which can effectively reduce a number of applications of the initial excitation power supply and prolong the service life of an initial excitation contactor, so that the full conduction of the rectifier bridge may also be used as an emergency measure when the initial excitation power supply fails. If the terminal voltage of the generator cannot be effectively improved by the full conduction of the rectifier bridge due to too low remanent magnetism/residual voltage of the generator, the initial excitation power supply may be used as a backup measure to ensure that the excitation process can be continuously executed normally. Voltage detection is set after excitation for 1 second, which can ensure that, when the remnant magnetism/residual voltage of the generator is too low, the full conduction stage of the rectifier bridge will not waste too much time.

Figure 11A:
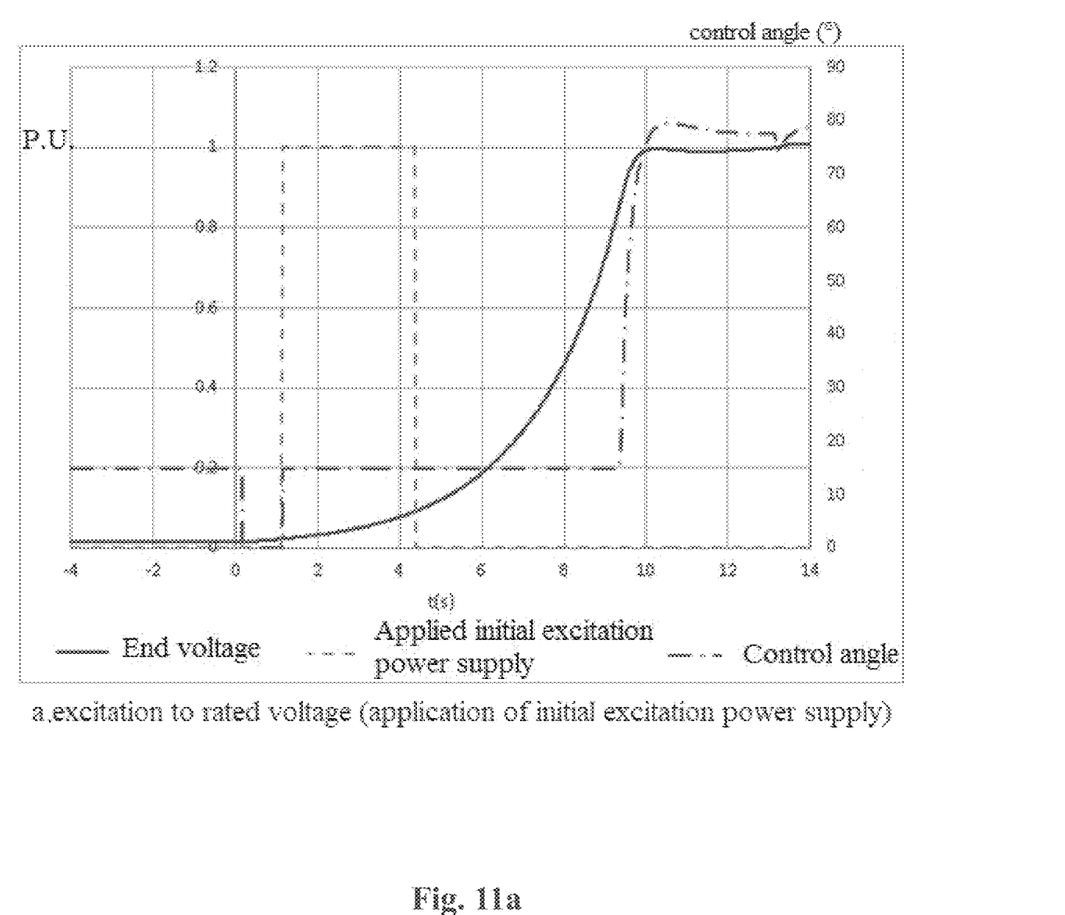
Figure 11B:
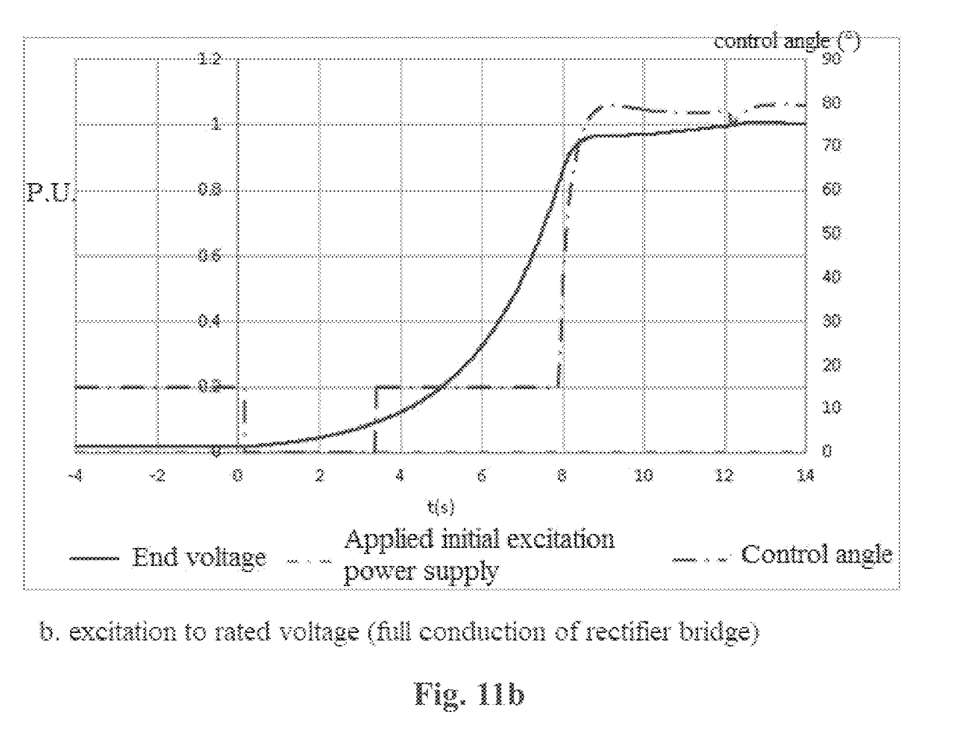

FIG. 11(a) shows an oscillogram of excitation in which the initial excitation power supply needs to be enabled when the residual voltage is too low: the terminal voltage does not rise after the rectifier bridge is fully conducted for 1 second, the rectifier bridge is withdrawn from the full conducting state, and the initial excitation power supply is enabled. FIG. 11(b) shows an oscillogram of excitation which can be realized successfully without needing to enable the initial excitation power supply when the residual voltage is high enough: the voltage is improved after the rectifier bridge is fully conducted for 1 second, so that the initial excitation power supply is not enabled, and after the rectifier bridge is fully conducted for about 3.5 seconds, the terminal voltage reaches 0.08 times the rated voltage, the rectifier bridge is withdrawn from the full conducting state and switched to closed-loop control.

The specific embodiments described herein are only illustrative to the spirit of the present invention. Those skilled in the technical field to which the present invention belongs may make various modifications or supplements to the specific embodiments described or make substitutions in a similar way, without departing from the spirit of the present invention or exceeding the scope defined by the appended claims.

What is claimed is:

1. An initial anode voltage establishment method for controlling a rectifier bridge by a rectifier bridge closed-loop control excitation method, wherein, the rectifier bridge closed-loop control excitation method comprises the following steps:

calculating, by an excitation system, a difference between an actually measured terminal voltage U of a generator and a given value Ref of the generator, calculating a rectifier bridge control angle through PID, and controlling a rectifier bridge according to the rectifier bridge control angle, wherein, in the rectifier bridge closed-loop control, the given value Ref is calculated by an excitation function with a period T, and the excitation function is a mathematical function $$Ref = Ref_0 \times \sin\left(11.9° + \frac{Start\_C}{Start\_T} \times 0.703°\right);$$

wherein, in a excitation process, at each time of a calculation by the excitation function, a count value of an excitation process counter is progressively increased by 1, and the given value Ref is an expected numerical value that the terminal voltage of the generator will be at each time of the calculation;

$Ref_0$ is a preset target given value, which is an expected numerical value that the terminal voltage of the generator will reach when the excitation process is ended; and in a case that Start_T=Start_C×T, when the actually measured terminal voltage U of the generator is greater than a second set voltage that is greater than a first set voltage, the excitation is considered to be completed, and when the actually measured terminal voltage U is less than or equal to the second set voltage, the excitation fails, wherein Start_C is a number of calculations by the excitation function recorded by the excitation process counter in the rectifier bridge closed loop control, Start_T is a time of the excitation process in the rectifier bridge closed-loop control, and T is the period of the calculation of the excitation function in the rectifier bridge closed-loop control;

wherein, the initial anode voltage establishment method comprises the following steps of:

step 1: when the excitation process starts, recording a current terminal voltage of the generator and a starting moment of the excitation process;

step 2: controlling, by the excitation system, all 6 bridge arms of a fully controlled rectify bridge to be conducted, and maintaining the rectifier bridge in a conducting state;

step 3: recording the terminal voltage of the generator again after 1 second from an excitation moment, when an increase of the terminal voltage of the generator is less than the first set voltage, proceeding to step 5, and when the increase of the terminal voltage of the generator is greater than or equal to the first set voltage, continuously maintaining the rectifier bridge in the full conducting state, and proceeding to step 4;

step 4: when the terminal voltage of the generator reaches the second set voltage within 4 seconds from the excitation moment, withdrawing the rectifier bridge from the full conducting state, and switching the rectifier bridge to the rectifier bridge closed-loop control, and when the terminal voltage of the generator does not reach the second set voltage within 4 seconds from the excitation moment, proceeding to step 5;

step 5: withdrawing the rectifier bridge from the full conducting state, enabling an initial excitation power supply, switching the rectifier bridge to the rectifier bridge closed-loop control, and then proceeding to step 6; and step 6: when the terminal voltage of the generator still does not rise to the second set voltage within 10 seconds from the starting moment, stopping output by the excitation system, and reporting an excitation failure fault; and when the terminal voltage of the generator rises to the second set voltage within 10 seconds from the starting moment, terminating the initial excitation power supply, and continuously executing the excitation process.

2. The initial anode voltage establishment method according to claim 1, wherein the first set voltage is 0.006 times a rated voltage, and the second set voltage is 0.08 times a rated voltage.

* * * * *